(12) United States Patent
Sugiyama et al.

(10) Patent No.: US 8,438,605 B2
(45) Date of Patent: May 7, 2013

(54) VIDEO DISTRIBUTION SYSTEM AND VIDEO DISTRIBUTION METHOD

(75) Inventors: Kaori Sugiyama, Minato-ku (JP); Katsuhiro Ochiai, Minato-ku (JP)

(73) Assignee: NEC Corporation, Tokyo (JP)

(*) Notice: Subject to any disclaimer, the term of this patent is extended or adjusted under 35 U.S.C. 154(b) by 389 days.

(21) Appl. No.: 12/524,195

(22) PCT Filed: Jan. 28, 2008

(86) PCT No.: PCT/JP2008/051196
§ 371 (c)(1),
(2), (4) Date: Jul. 23, 2009

(87) PCT Pub. No.: WO2008/091009
PCT Pub. Date: Jul. 31, 2008

(65) Prior Publication Data
US 2010/0100914 A1    Apr. 22, 2010

(30) Foreign Application Priority Data

Jan. 26, 2007  (JP) ................................ 2007-016380

(51) Int. Cl.
*H04N 7/173*  (2011.01)
(52) U.S. Cl.
USPC ........................... 725/109; 725/116; 709/219
(58) Field of Classification Search ............ 725/86–116; 709/217–232
See application file for complete search history.

(56) References Cited

U.S. PATENT DOCUMENTS

| 7,966,645 B2* | 6/2011 | Panda et al. ....................... 726/1 |
| 2007/0192807 A1* | 8/2007 | Howcroft ......................... 725/86 |
| 2009/0320077 A1* | 12/2009 | Gazdzinski ..................... 725/62 |

FOREIGN PATENT DOCUMENTS

| JP | 2003-051846 A | 2/2003 |
| JP | 2005-012655 A | 1/2005 |
| JP | 2005-328508 A | 11/2005 |

OTHER PUBLICATIONS

Kouji Sato et al., "Implementation of SIP adaptation function for QoS negotiation in NGN", IEICE Technical Report, (Technical Report of IEICE) CS2005-46, Nov. 10, 205, pp. 55-60.
Hideo Imanaka et al., "NGN Release 1 Service Yokyo Joken to Kino Seigyo Architecture", The Journal of the Institute of Electronics, Information and Communication Engineers, Dec. 1, 2006, vol. 89, No. 12, pp. 1051-1056.
Kentaro Takahashi, "NGNtte Nandaro?", Nikkei Network, Nov. 22, 2006, pp. 67-83, No. 80.

* cited by examiner

*Primary Examiner* — Annan Shang
(74) *Attorney, Agent, or Firm* — Sughrue Mion, PLLC

(57) ABSTRACT

A video distribution system according to the present invention includes a user terminal, an SIP session controller, and a video distribution server. When the SIP session controller receives a request to establish a session, the SIP session controller establishes a session between the user terminal and the video distribution server, and controls a bandwidth controller to reserve a bandwidth for the distribution of video content in a communication path between the user terminal and the video distribution server. The video distribution server sends a bandwidth changing request for requesting the SIP session controller to change the bandwidth to reserve a bandwidth depending on a fraction of the bandwidth that is needed for distributing video content. In response to the bandwidth changing request, the SIP session controller further secures a bandwidth for the distribution of video content in the communication path between the user terminal and the video distribution server.

14 Claims, 10 Drawing Sheets

VIDEO DISTRIBUTION SYSTEM AND VIDEO DISTRIBUTION METHOD

TECHNICAL FIELD

The present invention relates to a system for and a method of distributing video using an IP (Internet Protocol) network.

BACKGROUND ART

Video distribution systems have been suffering problems in that they fail to provide sufficiently guaranteed QoS (Quality of Service) and, as a result, cannot guarantee a bandwidth that is required for distributing video content and do not necessarily render services that operate stably.

The invention disclosed in Patent document 1 (JP-A No. 2003-051846) is directed to a technology for obtaining a bandwidth required for video distribution. Patent document 1 reveals a system wherein when a content request is received from a user terminal, a content server sends a bandwidth reservation request to a region manager, and, if the region manager is able to accept the bandwidth reservation request, the region manager sends a bandwidth reservation setting request to a bandwidth controller.

Patent document 2 (JP-A No. 2005-12655) has been proposed because the control between the content server and the region manager in the invention disclosed in Patent document 1 is complex and it has cost and flexibility problems that remain to be solved because general-purpose protocols are not applied.

According to the invention disclosed in Patent document 2, when a terminal requests a content distribution subsystem to establish a session, an SIP (Session Initiation Protocol) session control subsystem acquires information about a bandwidth needed for viewing content from the content distribution subsystem, and sends a bandwidth reservation request to a bandwidth control subsystem, and the content distribution subsystem transmits the content to the terminal in the bandwidth that is secured by the bandwidth control subsystem.

Patent document 1: JP-A No. 2003-051846
Patent document 2: JP-A No. 2005-12655

DISCLOSURE OF THE INVENTION

Problems to be Solved by the Invention

When a video distribution server receives a distribution request from a user terminal, the video distribution server can determine a bandwidth to be used to distribute the video content taking into consideration that the bandwidth that is currently available for use and the bandwidth that is needed to receive video content by negotiation with the user terminal. However, if the bandwidth has already been set in advance, it is difficult to apply such a flexible approach to selecting a desired bandwidth.

According to the invention disclosed in Patent document 1, the control between the content server and the region manager is complex and problems that remain to be solved include cost and flexibility because general-purpose protocols have not been applied.

Generally, a video distribution server determines a bandwidth required to distribute video through negotiation with a user terminal when the video distribution server receives a distribution start request from the user terminal. According to a process of reserving a bandwidth based on the SIP, it is necessary to reserve a bandwidth for distributing video when a session is established. Before the session is established, it is necessary to acquire information required to reserve the bandwidth, and a portal server, etc. needs to be provided with the same information as the information which the video distribution server possesses regarding about a bandwidth that is required to distribute each item of video content.

According to the invention disclosed in Patent document 2, the SIP session control subsystem acquires information about a bandwidth that is required to view video content from the content distribution subsystem, and sends a bandwidth reservation request to the bandwidth control subsystem, and the content distribution subsystem transmits the video content to the terminal in the bandwidth reserved by the bandwidth control subsystem. According to a specific configuration, the SIP session control subsystem acquires bandwidth information from the content distribution subsystem, accumulates the acquired bandwidth information, and reserves a bandwidth based on the accumulated bandwidth information. Therefore, the SIP session control subsystem needs a unique configuration and still suffers cost and flexibility problems.

An NGN (Next Generation Network) has a function module for performing QoS control and authentication, and is able to provide stable communication services by controlling sessions using an SIP (Session Initiation Protocol) server group referred to as IMS (IP Multimedia Subsystems).

The present invention has been made in view of the problems of the background art described above. It is an object of the present invention to provide a high-quality video distribution service which guarantees QoS on an NGN without significantly modifying portal servers and video distribution server of the background art.

Means for Solving the Problems

A video distribution system according to the present invention comprises a user terminal, a bandwidth controller, an SIP session controller, and a video distribution server which are interconnected through an IP network, wherein:

said portal server stores content information for use by the user terminal to establish a session with the video distribution server;

said user terminal acquires the content information from said portal server and sends a session establishing request for requesting said SIP session controller to establish a session according to an SIP with the video distribution server indicated by said content information;

when said SIP session controller receives said session establishing request, said SIP session controller establishes a session between said user terminal and said video distribution server, and sends a bandwidth securing request for requesting said bandwidth controller to reserve a bandwidth for the distribution of video content in a communication path between said user terminal and said video distribution server;

when said bandwidth controller receives said bandwidth securing request, said bandwidth controller secures the bandwidth for the distribution of video content in the communication path between said user terminal and said video distribution server;

said video distribution server sends a bandwidth changing request for requesting said SIP session controller to change the bandwidth for further securing a bandwidth depending on a fraction of a bandwidth that is needed for distributing video content;

when said SIP session controller receives said bandwidth changing request, said SIP session controller sends a bandwidth re-securing request for requesting said bandwidth controller to secure a further bandwidth for the distribution of video content in the communication path between said user terminal and said video distribution server; and when said bandwidth controller receives said bandwidth re-securing request, said bandwidth controller secures a further bandwidth in the communication path between said user terminal and said video distribution server.

A video distribution method according to the present invention is to be carried out in a video distribution system including a user terminal, a bandwidth controller, an SIP session controller, a video distribution server, and a portal server which are interconnected through an IP network, the portal server storing content information for the user terminal to establish a session with the video distribution server, wherein:

said user terminal acquires the content information from said portal server and sends a session establishing request for requesting said SIP session controller to establish a session according to an SIP with the video distribution server indicated by said content information;

upon reception of said session establishing request, said SIP session controller establishes a session between said user terminal and said video distribution server, and sends a bandwidth securing request for requesting said bandwidth controller to reserve a bandwidth for the distribution of video content in a communication path between said user terminal and said video distribution server;

upon reception of said bandwidth securing request, said bandwidth controller secures the bandwidth for the distribution of video content in the communication path between said user terminal and said video distribution server;

said video distribution server sends a bandwidth changing request for requesting said SIP session controller to change the bandwidth for further securing a bandwidth depending on a fraction of a bandwidth that is needed for distributing video content;

upon reception of said bandwidth changing request, said SIP session controller sends a bandwidth re-securing request for requesting said bandwidth controller to secure a further bandwidth for the distribution of video content in the communication path between said user terminal and said video distribution server; and upon reception of said bandwidth re-securing request, said bandwidth controller secures a further bandwidth in the communication path between said user terminal and said video distribution server.

According to the present invention thus arranged, upon reception of a session establishing request, the SIP session controller establishes a session between the user terminal and the video distribution server, and sends a bandwidth securing request for requesting the bandwidth controller to reserve a bandwidth for the distribution of video content in a communication path between the user terminal and the video distribution server. At this time, the bandwidth securing request is of a unique nature not based on bandwidth information. Thereafter, when a request that is made that the bandwidth be changed, depending on a fraction of the bandwidth that is needed for the distribution of video content, in order to implement the distribution of video content, a further bandwidth is reserved in the same manner as when the session is established.

The present invention thus arranged offers the following advantages:

In the video distribution server, a bandwidth that is required for distributing video content is determined by a negotiation with the user terminal at the time a distribution start request is received from the user terminal. According to the present invention, when an SIP session is established, a minimum bandwidth for sending a control signal for video distribution according to the RTSP or the like is secured. When the video distribution server receives the distribution start request and finds a bandwidth that is required for distributing a video content, a required bandwidth is newly secured. Therefore, the portal server, etc. does not need to have information about the bandwidth that is required for the distribution of video content. Furthermore, since an actual bandwidth is secured after a required bandwidth is determined by negotiation between the user terminal and the video distribution server, a bandwidth that is used can flexibly set by taking into consideration the bandwidth that is available for use and the capability of the user terminal. The bandwidth can efficiently be utilized as only the required bandwidth is secured.

As a result, it is possible to provide a high-quality video distribution service which guarantees QoS economically, by using the session control function of an SIP and a bandwidth guaranteeing function of an IP network.

DESCRIPTION OF REFERENCE CHARACTERS

Figure 1:
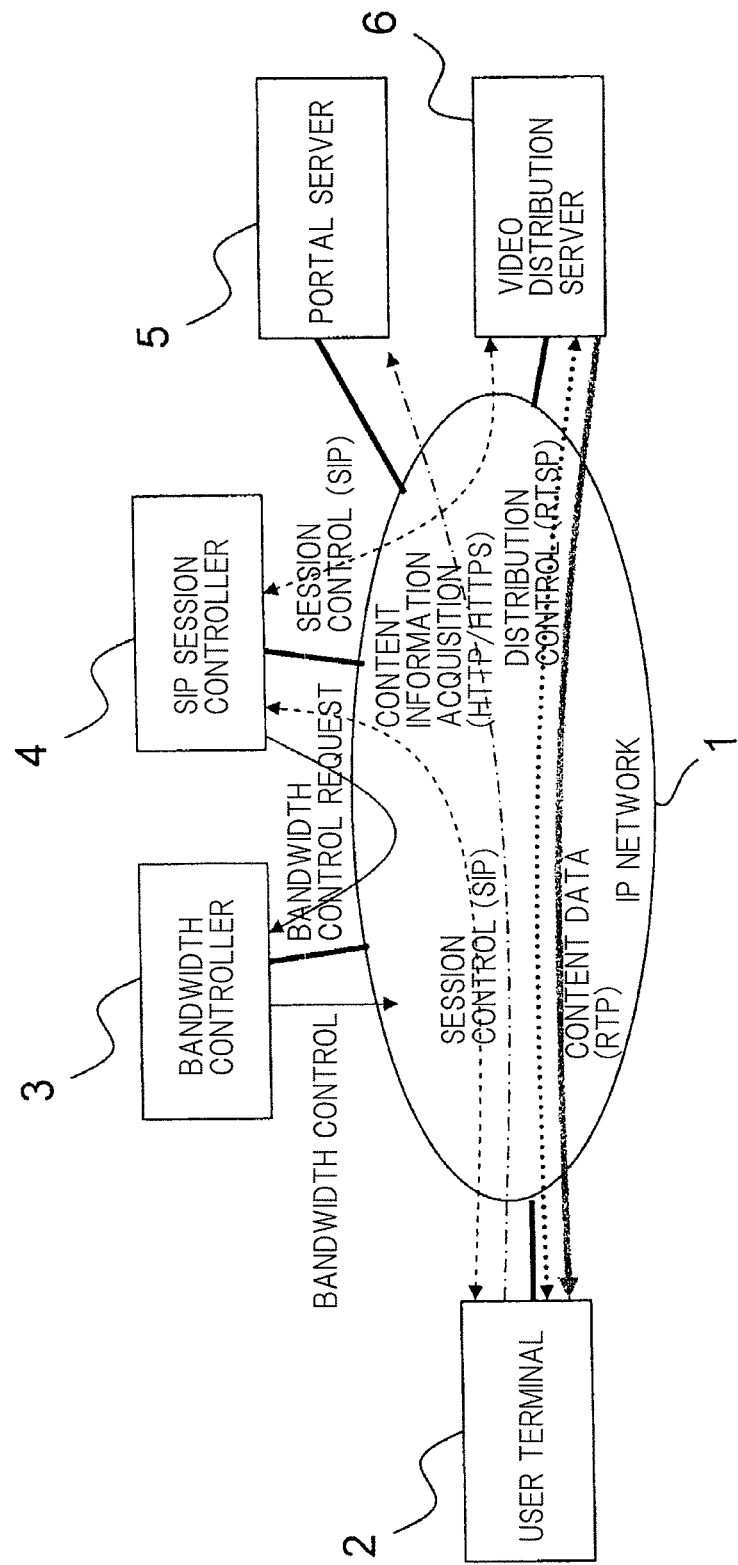
FIG. 1 is a block diagram of a configuration according to a first exemplary embodiment of the present invention.

1 IP network
2 user terminal
3 bandwidth controller
4 SIP session controller
5 portal server
6 video distribution server

BEST MODE FOR CARRYING OUT THE INVENTION

A first exemplary embodiment of the present invention will be described below with reference to the drawings.

FIG. 1 is a block diagram of a configuration according to the first exemplary embodiment of the present invention. As shown in FIG. 1, the present exemplary embodiment comprises IP network 1 which is an NGN, user terminal 2, bandwidth controller 3, SIP session controller 4, portable server 5, and video distribution server 6. User terminal 2, bandwidth controller 3, SIP session controller 4, portable server 5, and video distribution server 6 are interconnected through IP network 1.

Each of user terminal 2, bandwidth controller 3, SIP session controller 4, portable server 5, and video distribution server 6 includes a CPU, a main memory, an output device, an input device, an external storage, etc., and is assumed to be of a computer configuration for installing programs and data stored in a recording medium such as a CD-ROM or the like into external storage through an optical disk drive or the like, reading the programs and data from external storage into the main memory, and processing the programs and data with the CPU for thereby performing various functions. However, they are not limited to the above configuration insofar as they have equivalent functions where any of the functions may be hardware-implemented.

IP network 1 includes devices such as routers or the like which have a function to secure a specified communication bandwidth in response to a request from bandwidth controller 3.

User terminal 2 is a communication terminal provided as a PC (Personal Computer) or a dedicated STB (Set Top Box). User terminal 2 is operated by the user to acquire content desired by the user from video distribution server 6 through IP network 1 and display the content on the output device which may be a display or the like.

User terminal 2 has a function to, when the user is to acquire content, access portal server 5 which is a WWW server according to the HTTP or HTTPS and acquire session information of the content desired by the user and meta information about the content. For acquiring the content, user terminal 2 sends an SIP request and receives an SIP response based on the SIP (Session Initiation Protocol), and cooperates with video distribution server 6 and SIP session controller 4 to reserve a bandwidth required to receive the content.

SIP session controller 4 controls the establishment and end of a session between user terminal 2 and video distribution server 6, and controls bandwidth controller 3 to reserve a bandwidth required to distribute the requested content from video distribution server 6.

Based on a request from SIP session controller 4, bandwidth controller 3 controls devices such as routers or the like that are present on a route between user terminal 2 and video distribution server 6, and secures a bandwidth for a communication path on the route.

Portal server 5 is generally configured as a WWW server, and provides user terminal 2 with an electronic program table of contents that can be viewed by the user and also with the session information of the content desired by the user and the meta information about the content.

Video distribution server 6 cooperates with SIP session controller 4 according to the SIP, and establishes a session with user terminal 2 and secures a bandwidth required to distribute the content to user terminal 2. After having secured the bandwidth, video distribution server 6 controls the content distribution according to the RTSP (Real Time Streaming Protocol) or the like, and distributes the content data to user terminal 2 according to a protocol such as the RTP (Real time Transport Protocol).

Figure 2:
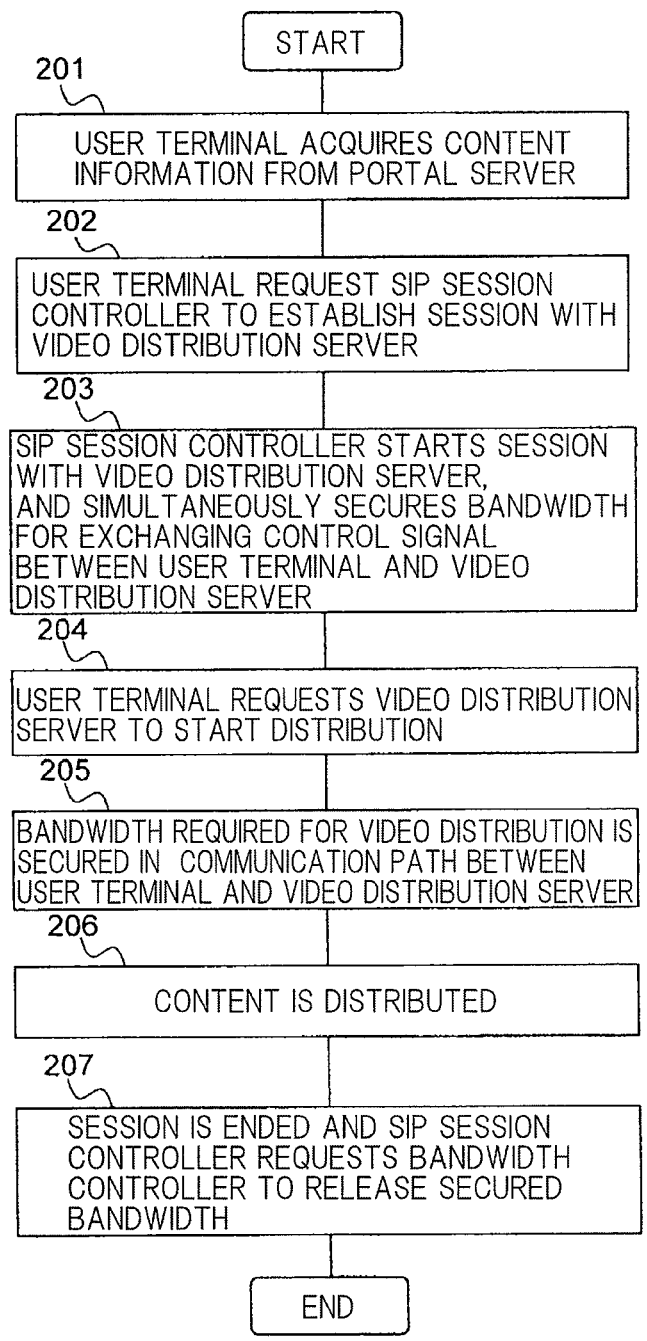
FIG. 2 is a flowchart of an operation of the first exemplary embodiment of the present invention.
Figure 3:
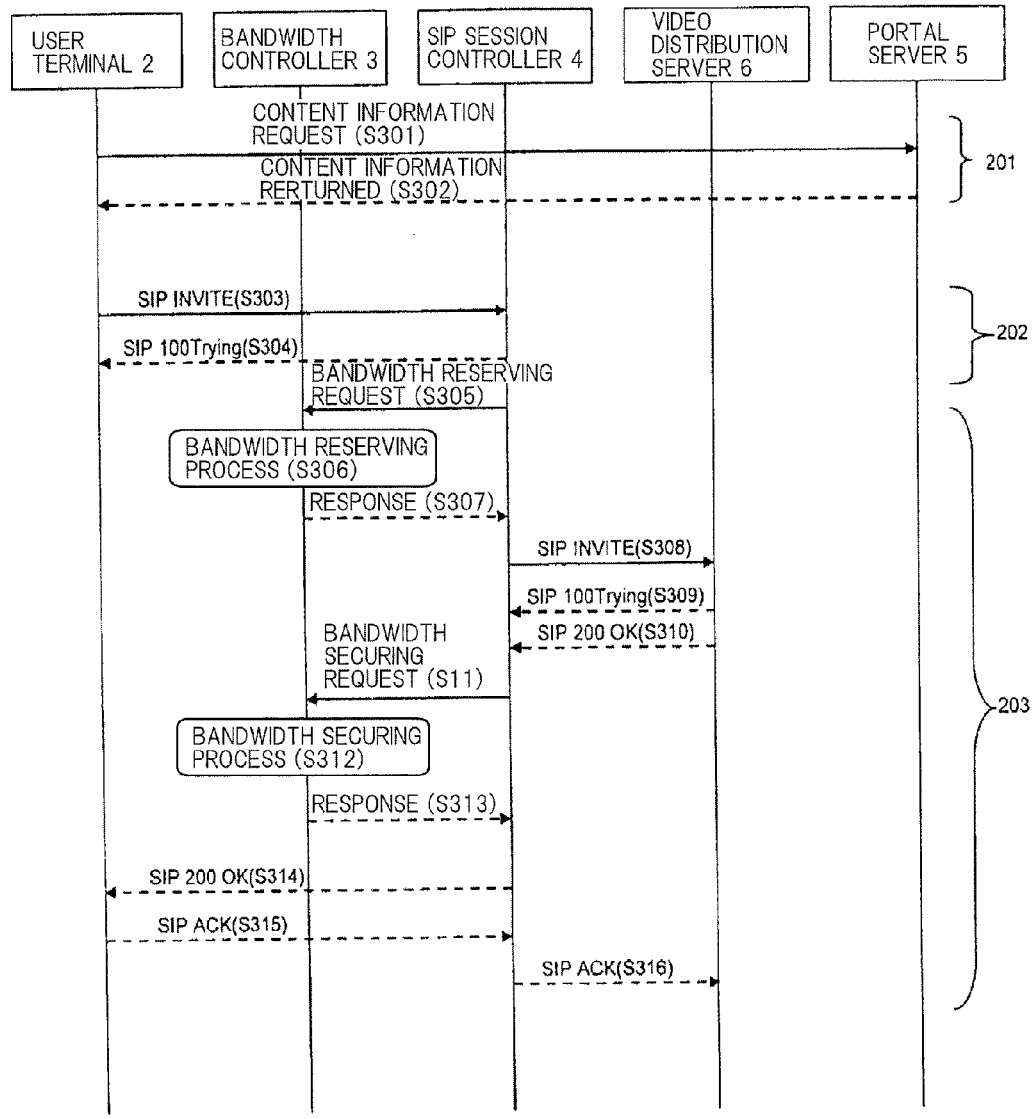
FIG. 3 is a sequence diagram showing specific details of the operation of the first exemplary embodiment of the present invention.
Figure 4:
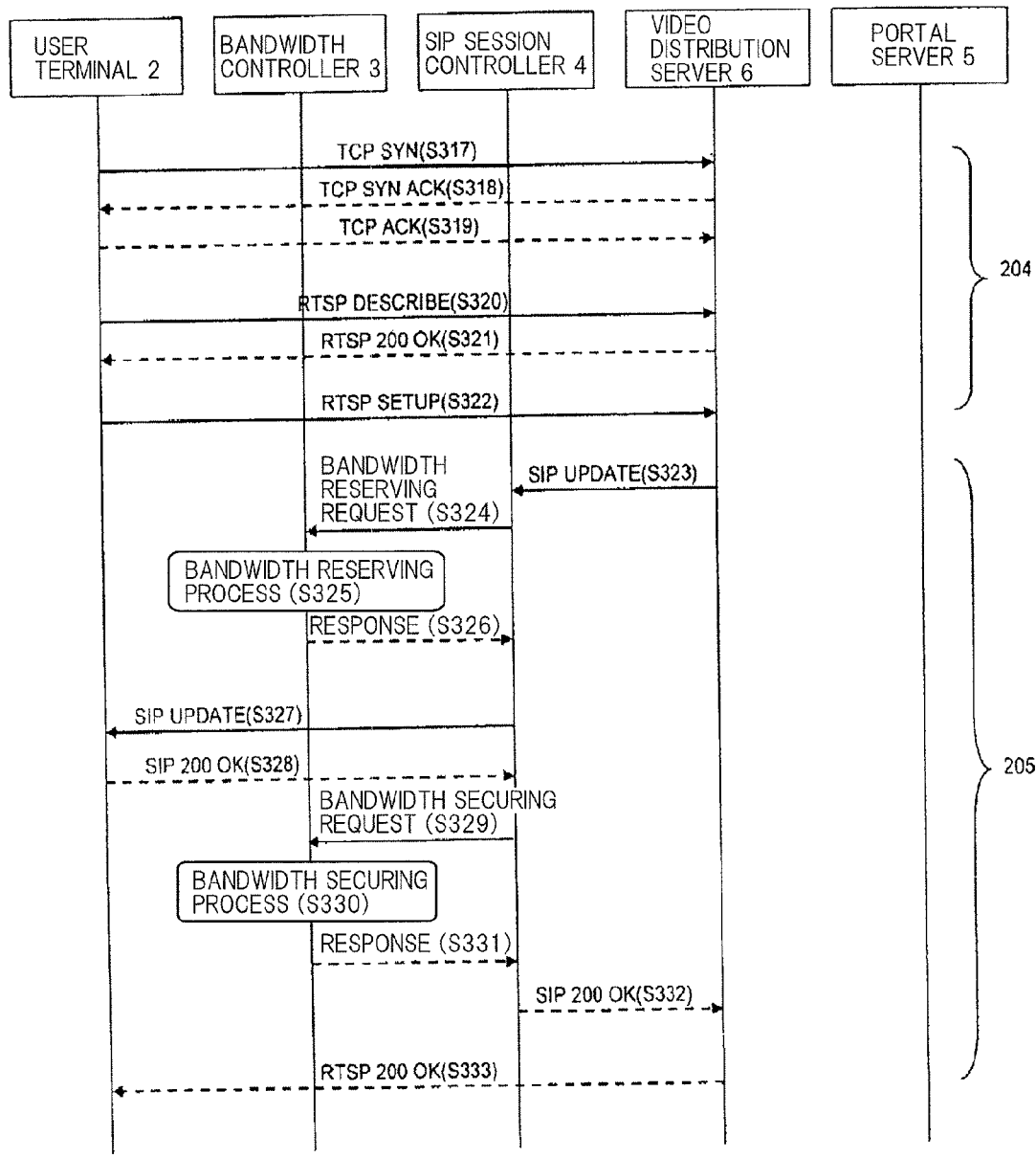
FIG. 4 is a sequence diagram showing specific details of the operation of the first exemplary embodiment of the present invention.
Figure 5:
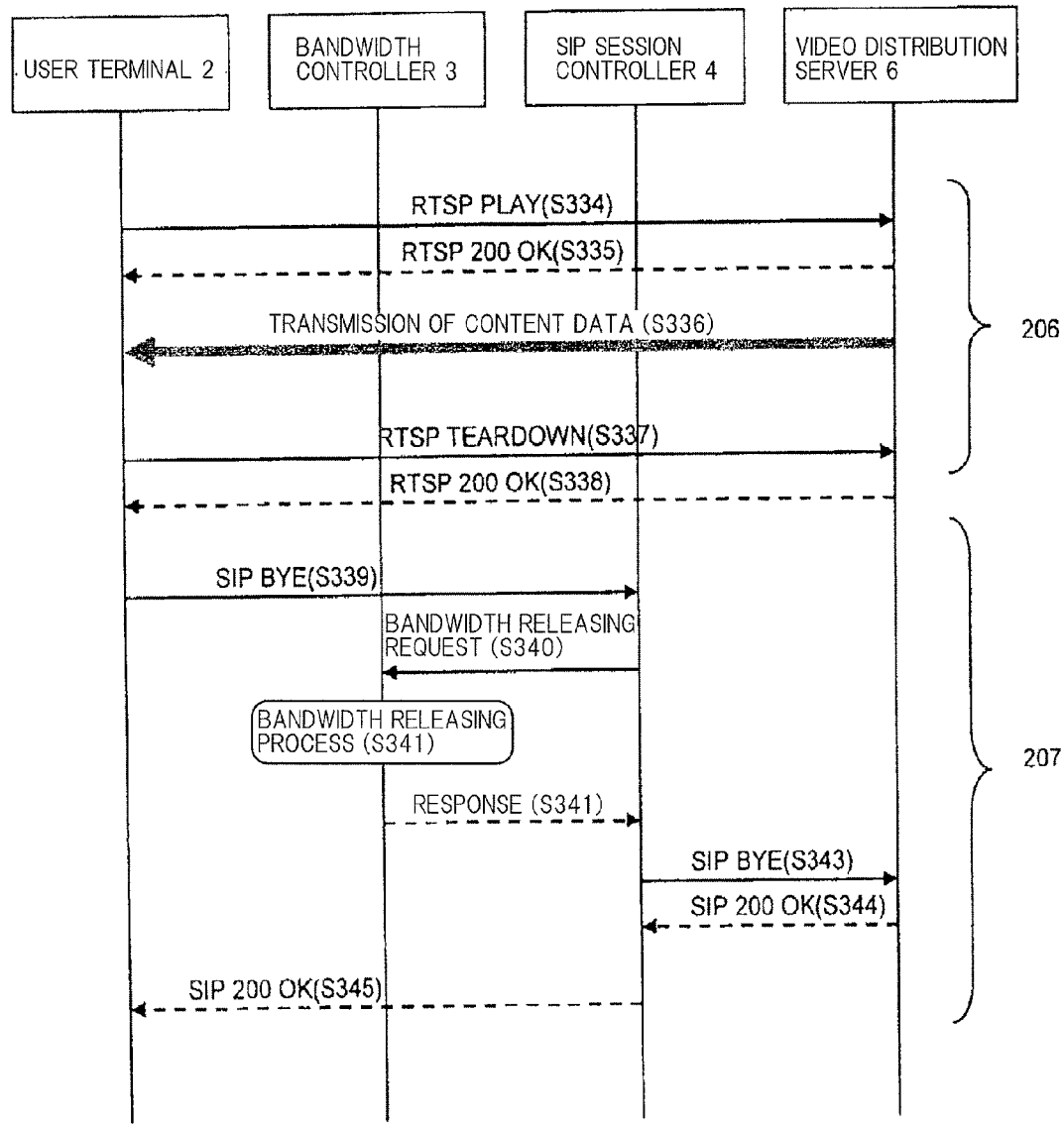
FIG. 5 is a sequence diagram showing specific details of the operation of the first exemplary embodiment of the present invention.

FIG. 2 is a flowchart of an operation of the present exemplary embodiment, and FIGS. 3 through 5 are sequence diagrams showing specific details of the operation of the present exemplary embodiment. The operation of the present exemplary embodiment will be described in detail below with reference to FIGS. 1 through 5.

The operation of the present exemplary embodiment is generally shown in the flowchart of FIG. 2, and detailed sequences of the steps shown in FIG. 2 are illustrated in the sequence diagrams of FIGS. 3 through 5. The numbers 201 through 207 shown on the right margins of the sequence diagrams of FIGS. 3 through 5 correspond to the respective steps shown in the flowchart of FIG. 2.

In the present exemplary embodiment, a sequence process for distributing video content on a bandwidth-guaranteed basis is as follows:

In step 201, in order to receive content distributed from portal server 5, user terminal 2 acquires session information such as addresses for accessing video distribution server 6 and meta information such as the title of the content.

A specific sequence will be described below:

User terminal 2 accesses portal server 5 according to the HTTP or HTTPS and requests that information regarding be viewed (S301). Portal server 5 sends content information including session information such as SIP URI for establishing a session with video distribution server 6 and meta information such as the title of the content, to user terminal 2 (S302).

In step 202, user terminal 2 requests SIP session controller 4 to establish a session with video distribution server 6, using the session information acquired from portal server 5.

A specific sequence will be described below:

User terminal 2 sends an SIP INVITE message to SIP session controller 4 (S303). SIP session controller 4 sends SIP 100 Trying as a temporary response to SIP INVITE in S303 to user terminal 2 (S304).

In step 203, based on the request from user terminal 2, SIP session controller 4 establishes a session with video distribution server 6, and requests that bandwidth controller 3 reserve a bandwidth for the distribution of video content control in a communication path between user terminal 2 and video distribution server 6.

A specific sequence will be described below:

SIP session controller 4 sends a bandwidth reserving request for sending and receiving an RTSP (Real Time Streaming Protocol) signal for video distribution control to bandwidth controller 3 (S305).

Bandwidth controller 3 performs a bandwidth reservation process on the routers on IP network 1 (S306). When the bandwidth reservation is successful, bandwidth controller 3 sends a confirmation response to SIP session controller 4 (S307).

When the bandwidth reservation is successful and it is found that the bandwidth can be secured, SIP session controller 4 sends SIP INVITE as a request to establish a session to video distribution server 6 (S308).

Video distribution server 6 sends SIP 100 Trying as a temporary response to SIP INVITE to SIP session controller 4 (S309).

Video distribution server 6 sends SIP 200 OK as a success response to SIP INVITE to SIP session controller 4 (S310). When a session is successfully established with video distribution server 6, SIP session controller 4 sends a bandwidth securing request to bandwidth controller 3 (S311).

In response to the bandwidth securing request, bandwidth controller 3 operates devices such as routers or the like in IP network 1 to perform a bandwidth securing process (S312). When a bandwidth is successfully secured, bandwidth controller 3 sends a success response to SIP session controller 4 (S313).

When the bandwidth is successfully secured, SIP session controller 4 sends SIP 200 OK as a success response to SIP INVITE in S3 to user terminal 2 (S314). In response to SIP 200 OK, user terminal 2 sends SIP ACK indicating acknowledgement of the successful session establishment to SIP session controller 4 (S315).

SIP session controller 4 sends SIP ACK in response to the successful session establishment message (S310) from video distribution server 6 (S316).

In step 204, when user terminal 2 successfully establishes the session with video distribution server 6, user terminal 2 requests video distribution server 6 to start distributing the content.

A specific sequence will be described below:

First, user terminal 2 establishes a TCP (Transmission Control Protocol) session for using the RTSP (Real Time Streaming Protocol) with video distribution server 6. User terminal 2 sends TCP SYN to video distribution server 6 (S317), and video distribution server 6 sends TCP SYN ACK in response to TCP SYN to user terminal 2 (S318).

User terminal 2 sends TCP ACK to video distribution server 6 (S319), whereupon the TCP session is established between user terminal 2 and video distribution server 6. When the TCP session is established, user terminal 2 requests that video distribution server 6 start distributing the video according to the RTSP.

User terminal 2 sends RTSP DESCRIBE to video distribution server 6 (S320), and video distribution server 6 sends TRSP 200 OK in response to RTSP DESCRIBE to user terminal 2 (S321). Functions that can be used are exchanged by communications in S320, S321. Thereafter, user terminal 2 sends RTSP SETUP to video distribution server 6 (S322) to perform a negotiation about the transmission process and ports.

In step 205, video distribution server 6 changes the bandwidth secured for SIP session controller 4 in step 203 to a fraction of bandwidth that is needed for distributing video content.

A specific sequence will be described below:

Video distribution server 6 sends SIP UPDATE as a bandwidth changing request for changing the bandwidth secured in step 203 to a fraction of the bandwidth that is needed for distributing video content, to SIP session controller 4 (S323). SIP session controller 4 requests bandwidth controller 3 to make a bandwidth reservation for video distribution (S324).

Bandwidth controller 3 operates routers or the like in IP network 1 to perform a bandwidth reserving process (S325). When a bandwidth is successfully reserved, bandwidth controller 3 sends a confirmation response to SIP session controller 4 (S326). When the bandwidth reservation is successful and it is found that the bandwidth can be secured, SIP session controller 4 sends SIP UPDATE to user terminal 2 (S327), indicating a change in the bandwidth that can be used.

In response to SIP UPDATE in S327, user terminal 2 sends SIP 200 OK to SIP session controller 4 (S328). SIP session controller 4 sends a request to secure the bandwidth reserved in S324, S325, S326 to bandwidth controller 3 (S329).

Bandwidth controller 3 operates routers or the like in IP network 1 to perform a bandwidth securing process (S330). When the bandwidth is successfully secured, bandwidth controller 3 sends a confirmation response to SIP session controller 4 (S331). When the bandwidth for the distribution of video content is successfully secured, SIP session controller 4 sends SIP 200 OK as a success response to SIP UPDATE in S323 to video distribution server 6 (S332).

Video distribution server 6 sends RTSP 200 OK as a success response to RTSP SETUP in S322 to user terminal 2 (S333).

In step 206, when securing of the bandwidth for the distribution of video content is completed, video distribution server 6 stars distributing the content based on the request from user terminal 2.

A specific sequence will be described below:

User terminal 2 sends RTSP PLAY as a playback start request to video distribution server 6 (S334), and video distribution server 6 sends RTSP 200 OK as a success response to RTSP PLAY in S34 to user terminal 2 (S335).

Video distribution server 6 sends the data of the video content to user terminal 2 according to the RTP or the like (S336). When the playback of the content is ended, user terminal 2 sends RTSP TERDOWN to video distribution server 6 (S337). When video distribution server 6 sends RTSP 200 OK as a response to S337 to user terminal 2 (S338), the video distribution is ended, cutting off the RTSP session.

When the content distribution is ended, the SIP session is ended and the secured bandwidth is released in step 207.

A specific sequence will be described below:

User terminal 2 sends SIP BYE as a session ending request to SIP session controller 4 (S339). SIP session controller 4 sends a bandwidth releasing request to bandwidth controller 3 (S340).

In response to the bandwidth releasing request, bandwidth controller 3 operates routers or the like in IP network 1 to perform a process of releasing the bandwidth secured for the session (S341). When the bandwidth is successfully released, bandwidth controller 3 sends a confirmation response to SIP session controller 4 (S342).

SIP session controller 4 sends SIP BYE as a session ending request to video distribution server 6 (S343). Video distribution server 6 sends SIP 20 OK as a response to SIP BYE in S343 to SIP session controller 4 (S344), whereupon the SIP session between SIP session controller 4 and video distribution server 6 is ended.

SIP session controller 4 sends SIP 200 OK as a response to SIP BYE in S339 to user terminal 2 (S345), whereupon the SIP session between SIP session controller 4 and user terminal 2 is ended.

According to the present invention, when an SIP session is established, the SIP session controller secures a minimum bandwidth for sending a control signal for video distribution according to the RTSP or the like. When video distribution server 6 receives a distribution start request and finds a bandwidth that is required for distributing video content, video distribution server 6 newly secures the required bandwidth. Therefore, portal server 5, etc. does not need to have information about a bandwidth required for the content. Furthermore, since an actual bandwidth is secured after a required bandwidth is determined by negotiation between user terminal 2 and video distribution server 6, a bandwidth that is used can flexibly set by taking into consideration the bandwidth that is available for use and the capability of the user terminal 2. The bandwidth can efficiently be utilized as only the required bandwidth is secured.

The present invention has been described above with respect to the exemplary embodiment. However, the present invention is not limited to the above exemplary embodiment. Various changes that can be understood by those skilled in the art may be made to the arrangement and to the details of the present invention within the scope of the present invention.

For example, though user terminal 2 acquires content information from portal server 5 in the present exemplary embodiment, content information may be stored in a storage medium in user terminal 2, rather than being acquired from portal server 5. Alternatively, content information may be acquired via an optical disk, an external memory, or the like, or may be acquired according to any desired process.

Though the specific sequence has been illustrated as a process for realizing each of the above steps, part of the sequence for executing each step may be omitted or the order may be changed. The protocols may be replaced with different protocols insofar as they can achieve the same functions.

Figure 6:
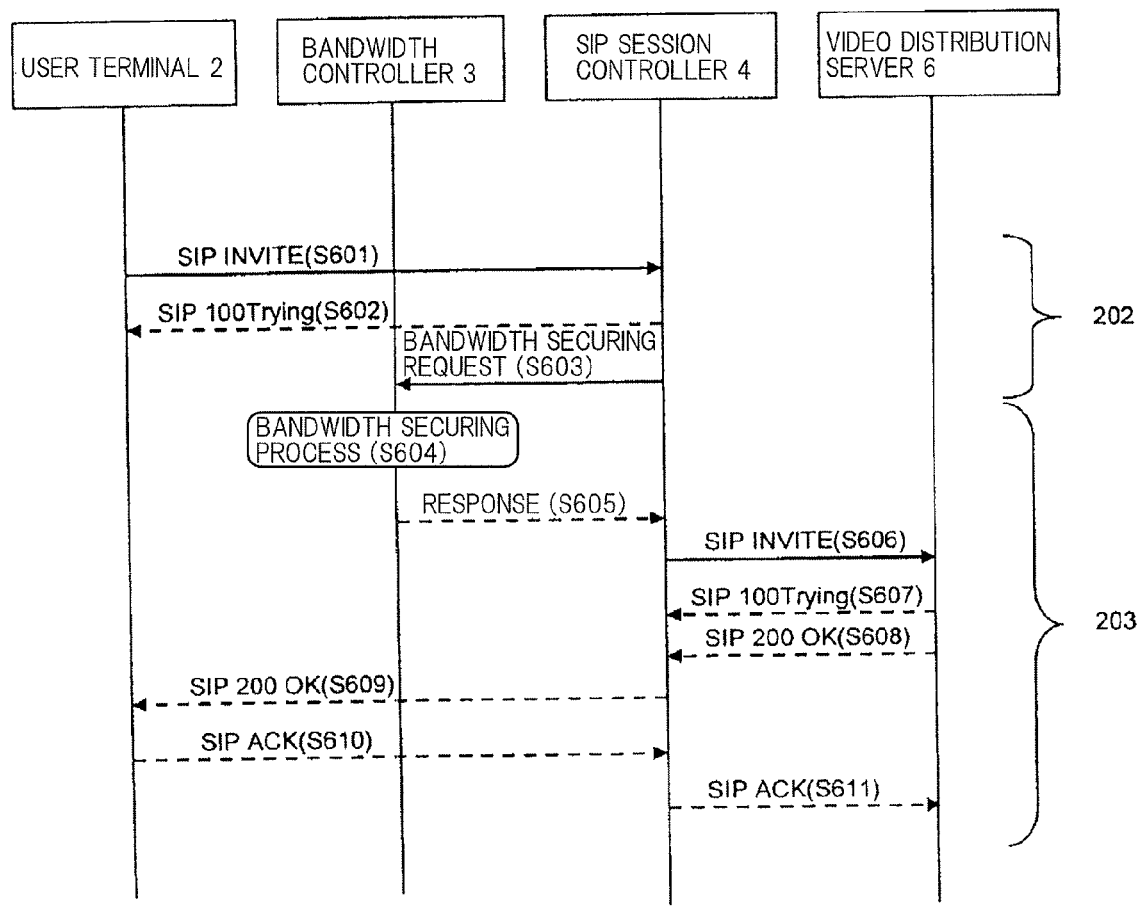
FIG. 6 is a sequence diagram showing specific details of the operation of the first exemplary embodiment of the present invention.

According to an example, as shown in FIG. 6, the bandwidth reserving process in step 202, step 203, and step 206 may be omitted.

A specific operation in step 202 and step 203 according to such an example will be described below with reference to FIG. 6.

In step 202, user terminal 2 requests SIP session controller 4 to establish a session with video distribution server 6, using the session information acquired from portal server 5.

A specific sequence will be described below:

User terminal 2 sends an SIP INVITE message to SIP session controller 4 (S601). SIP session controller 4 sends SIP 100 Trying as a temporary response to SIP INVITE in S303 to user terminal 2 (S602).

In step 203, based on the request from user terminal 2, SIP session controller 4 establishes a session with video distribution server 6, and requests that bandwidth controller 3 reserve a bandwidth for the distribution of video content control in a communication path between user terminal 2 and video distribution server 6.

A specific sequence will be described below:

SIP session controller 4 sends a bandwidth securing request for sending and receiving an RTSP (Real Time Streaming Protocol) signal for video distribution control to bandwidth controller 3 (S305).

In response to the bandwidth securing request, bandwidth controller 3 operates devices such as routers or the like in IP network 1 to perform a bandwidth securing process (S604). When a bandwidth is successfully secured, bandwidth controller 3 sends a success response to SIP session controller 4 (S605).

When the bandwidth is successfully secured, SIP session controller 4 sends SIP INVITE as a request to establish a session to video distribution server 6 (S606).

Video distribution server 6 sends SIP 100 Trying as a temporary response to SIP INVITE to SIP session controller 4 (S607).

Video distribution server 6 sends SIP 200 OK as a success response to SIP INVITE to SIP session controller 4 (S608).

SIP session controller 4 sends SIP 200 OK as a success response to SIP INVITE in S601 to user terminal 2 (S609). In response to SIP 200 OK, user terminal 2 sends SIP ACK indicating acknowledgement of the successful session establishment to SIP session controller 4 (S610).

SIP session controller 4 sends SIP ACK in response to the successful session establishment message (S308) from video distribution server 6 (S611).

Figure 7:
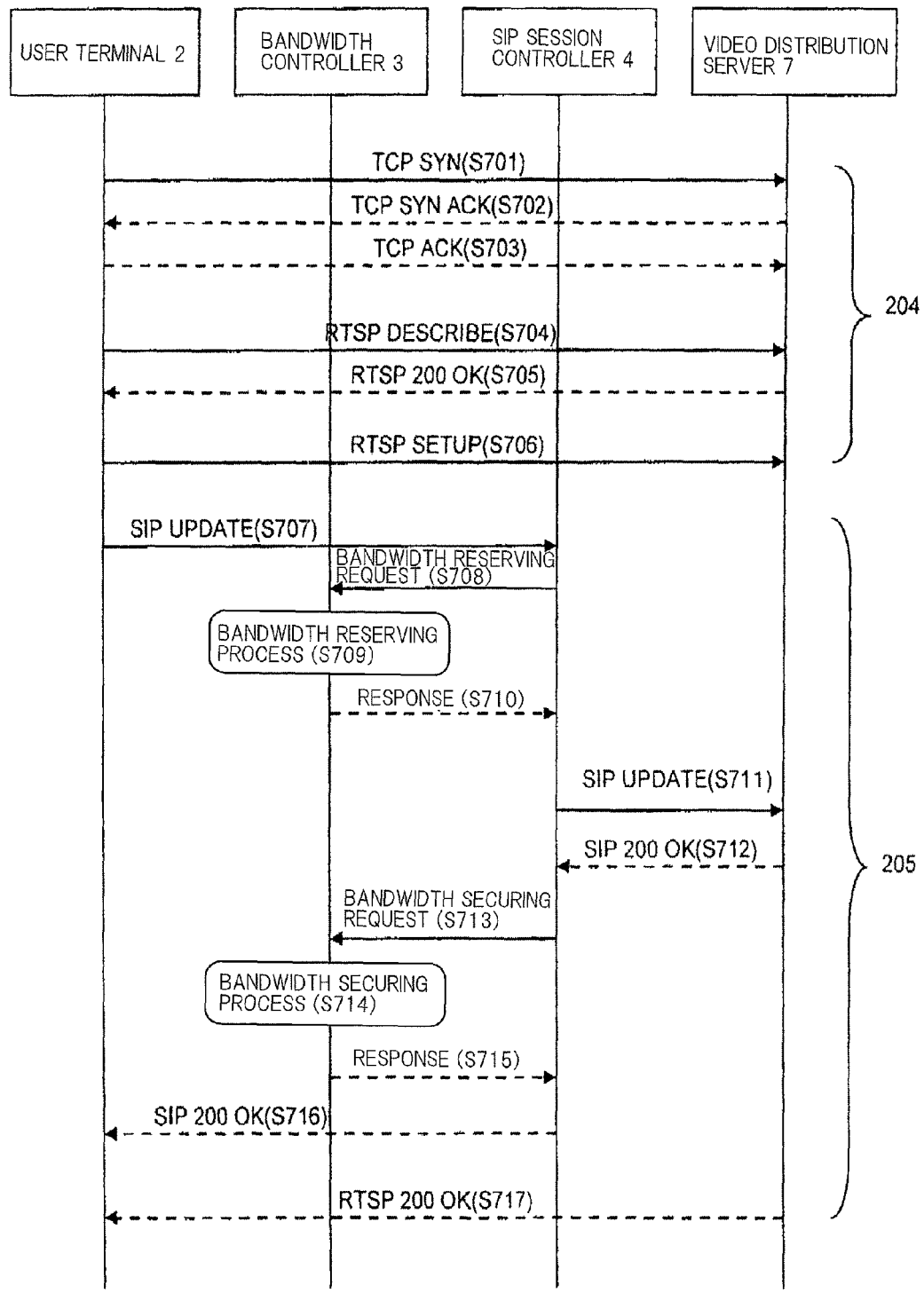
FIG. 7 is a sequence diagram showing specific details of the operation of the first exemplary embodiment of the present invention.

According to another example, as shown in FIG. 7, video distribution server 5 may send information about a required bandwidth to user terminal 2 according to the RTSP in step 204, and user terminal 2 may send a request to change the bandwidth in step 205.

A specific operation in step 204 and step 205 according to such an example will be described below with reference to FIG. 7.

In step 204, when user terminal 2 successfully establishes the session with video distribution server 6, user terminal 2 requests video distribution server 6 to start distributing the content, and acquires information about a bandwidth required to distribute the content.

A specific sequence will be described below:

First, user terminal 2 establishes a TCP (Transmission Control Protocol) session for using the RTSP (Real Time Streaming Protocol) with video distribution server 6. User terminal 2 sends TCP SYN to video distribution server 6 (S701), and video distribution server 6 sends TCP SYN ACK in response to TCP SYN to user terminal 2 (S702).

User terminal 2 sends TCP ACK to video distribution server 6 (S703), whereupon the TCP session is established between user terminal 2 and video distribution server 6. When the TCP session is established, user terminal 2 requests video distribution server 6 to start distributing the video according to the RTSP.

User terminal 2 sends RTSP DESCRIBE to video distribution server 6 (S704), and video distribution server 6 sends TRSP 200 OK in response to RTSP DESCRIBE to user terminal 2 (S705). In response to TRSP 200 OK, video distribution server 6 sends information about a bandwidth required to distribute the content to user terminal 2. Thereafter, user terminal 2 sends RTSP SETUP to video distribution server 6 (S706) to perform a negotiation about a transmission process and ports.

In step 205, a process of changing the bandwidth secured for SIP session controller 4 by user terminal 2 in step 303 to a fraction of the bandwidth that is needed for distributing video content is performed.

A specific sequence will be described below:

User terminal 2 sends SIP UPDATE as a bandwidth changing request for changing the bandwidth secured in step 203 to a fraction of the bandwidth that is needed for distributing video content, using the information, acquired in step 204, about the bandwidth required to distribute the content, to SIP session controller 4 (S707). SIP session controller 4 requests bandwidth controller 3 to make a bandwidth reservation for video distribution (S708).

Bandwidth controller 3 operates routers or the like in IP network 1 to perform a bandwidth reserving process (S709). When a bandwidth is successfully reserved, bandwidth controller 3 sends a confirmation response to SIP session controller 4 (S710). When the bandwidth reservation is successful and it is found that the bandwidth can be secured, SIP session controller 4 sends SIP UPDATE to video distribution server 6 (S711), indicating a change in the bandwidth that can be used.

Video distribution server 6 sends SIP 200 OK as a response to SIP UPDATE in S711 to SIP session controller 4 (S712). SIP session controller 4 sends a request to secure the bandwidth reserved in S708, S709, S710 to bandwidth controller 3 (S713).

Bandwidth controller 3 operates routers or the like in IP network 1 to perform a bandwidth securing process (S714). When the bandwidth is successfully secured, bandwidth controller 3 sends a confirmation response to SIP session controller 4 (S715). When the bandwidth for the distribution of video content is successfully secured, SIP session controller 4 sends SIP 200 OK as a success response to SIP UPDATE in S707 to user terminal 2 (S716).

Video distribution server 6 sends RTSP 200 OK as a success response to RTSP SETUP in S706 to user terminal 2 (S717).

2nd Exemplary Embodiment

A second exemplary embodiment of the present invention will be described below with reference to the drawings.

FIG. 1 shows a configuration of the present exemplary embodiment. The configuration of the present exemplary embodiment is identical to the configuration of the first exemplary embodiment. Therefore, only those features which are different from the first exemplary embodiment will be described below.

SIP session controller 4 controls the establishment and end of a session between user terminal 2 and video distribution server 6, and controls bandwidth controller 3 to reserve a bandwidth required to distribute the requested content from video distribution server 6 and also to perform a priority control process for enabling a packet of a particular kind to preferentially flow in a communication path.

Based on a request from SIP session controller 4, bandwidth controller 3 controls devices such as routers or the like that are present on a route between user terminal 2 and video distribution server 6 to reserve a bandwidth for a communication path on the route and perform a priority control process.

Figure 8:
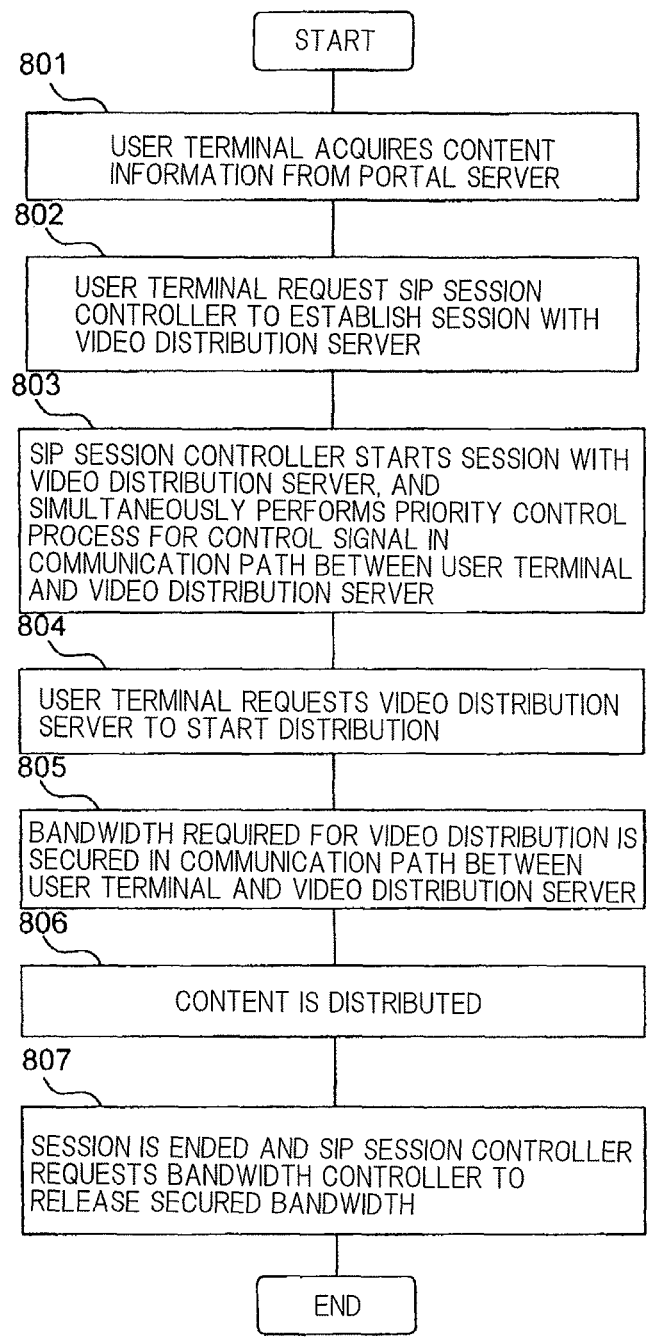
FIG. 8 is a flowchart of an operation of a second exemplary embodiment of the present invention.
Figure 9:
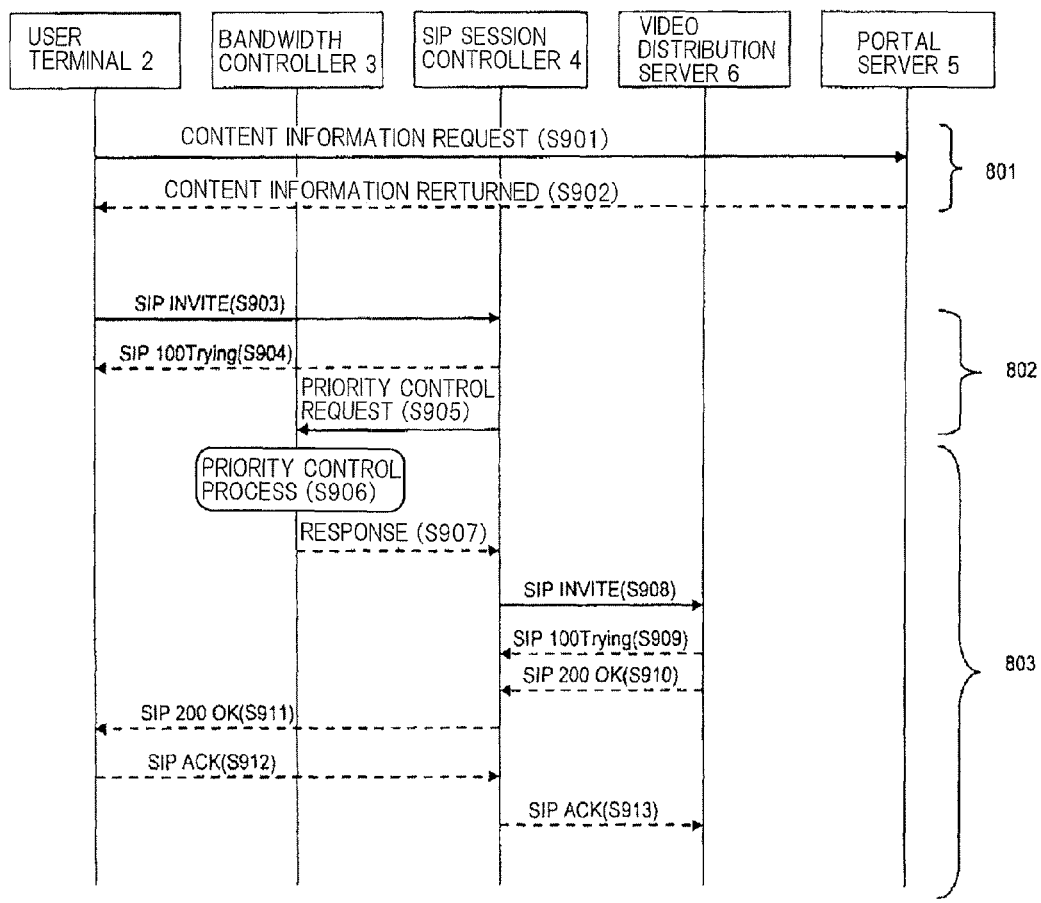
FIG. 9 is a sequence diagram showing specific details of the operation of the second exemplary embodiment of the present invention.
Figure 10:
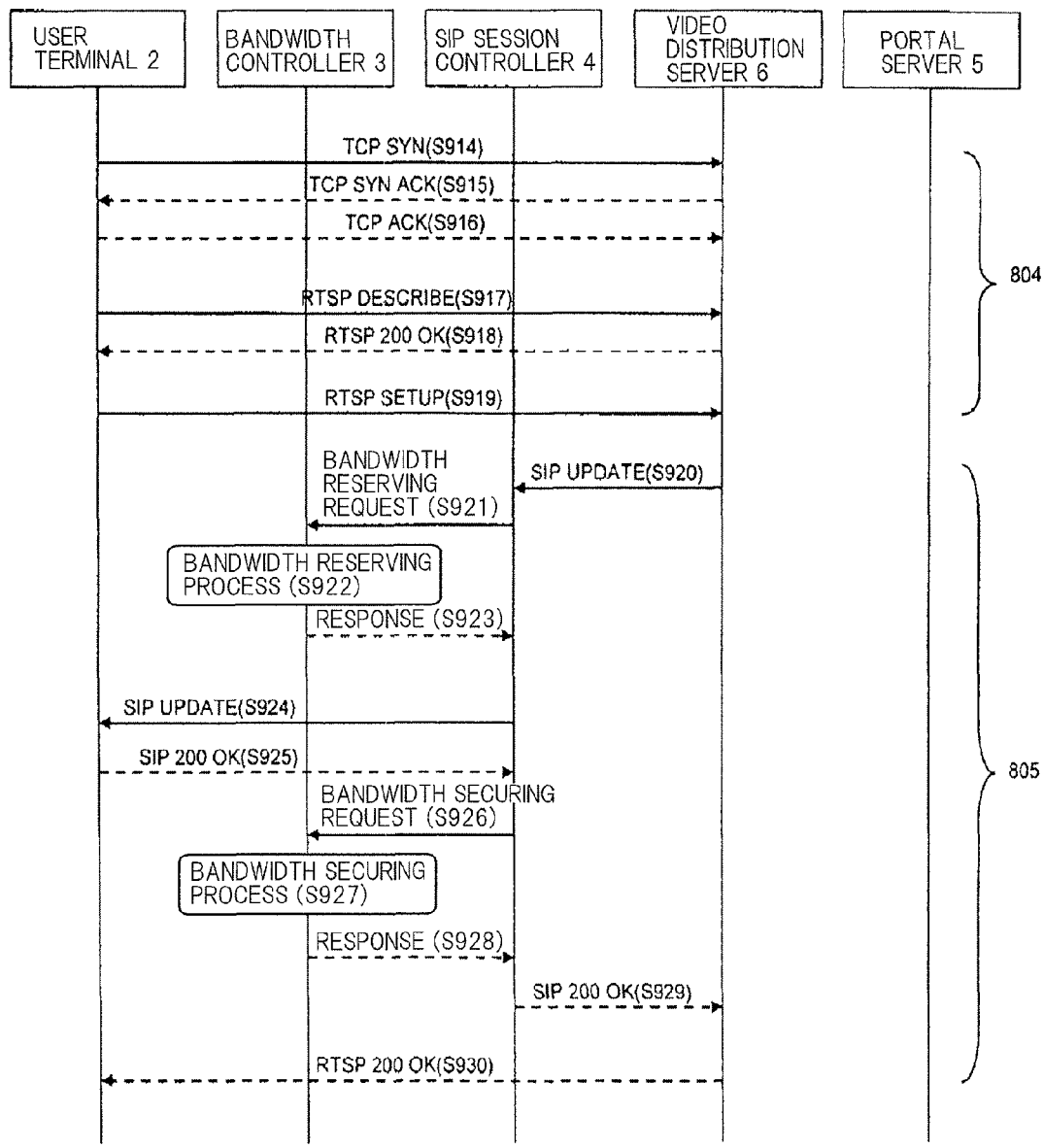
FIG. 10 is a sequence diagram showing specific details of the operation of the second exemplary embodiment of the present invention.

FIG. 8 is a flowchart of an operation of the present exemplary embodiment, and FIGS. 9 and 10 are sequence diagrams showing specific details of the operation of the present exemplary embodiment. The operation of the present exemplary embodiment will be described in detail below with reference to FIGS. 9 and 10.

The operation of the present exemplary embodiment is generally shown in the flowchart of FIG. 8, and detailed sequences of the steps shown in FIG. 2 are illustrated in the sequence diagrams of FIGS. 9 and 10. The numbers 801 through 805 shown on the right margins of the sequence diagrams of FIGS. 9 and 10 correspond to the respective steps shown in the flowchart of FIG. 8. Though the specific sequence is illustrated as a process of realizing each of the above steps, part of the sequence for executing each step may be omitted or changed in order. The protocols may be replaced with different protocols insofar as they can achieve the same functions.

In the present exemplary embodiment, a sequence process for distributing video content on a bandwidth-guaranteed basis is as follows:

Step 801, step 802, step 804, step 806, and step 807 according to the present exemplary embodiment are identical respectively to step 201, step 202, step 204, step 206, and step 207 according to the first exemplary embodiment, and will not be described below.

In step 803, based on the request from user terminal 2, SIP session controller 4 establishes a session with video distribution server 6, and requests bandwidth controller 3 to perform a wired control process for enabling a packet for video distribution control according to the RTSP to preferentially flow in a communication path between user terminal 2 and video distribution server 6.

A specific sequence will be described below:

SIP session controller 4 requests bandwidth controller 3 to enable a RTSP signal packet for video distribution control to flow preferentially (S905).

Bandwidth controller 3 performs a priority control process on the routers in IP network 1. When the priority control process is successful, bandwidth controller 3 sends a confirmation response to SIP session controller 4 (S907).

When the priority control process is successful, SIP session controller 4 sends SIP INVITE as a request to establish a session to video distribution server 6 (S908).

Video distribution server 6 sends SIP 100 Trying as a temporary response to SIP INVITE to SIP session controller 4 (S909).

Video distribution server 6 sends SIP 200 OK as a success response to SIP INVITE to SIP session controller 4 (S910).

When a bandwidth is successfully secured, SIP session controller 4 sends SIP 200 OK as a success response to SIP INVITE in S3 to user terminal 2 (S911). In response to SIP 200 OK, user terminal 2 sends SIP ACK indicating acknowledgement of the successful session establishment to SIP session controller 4 (S912).

SIP session controller 4 sends SIP ACK in response to the successful session establishment message (S908) from video distribution server 6 (S913).

In step 804, when user terminal 2 successfully establishes the session with video distribution server 6, user terminal 2 requests video distribution server 6 to start distributing the content.

In step 805, video distribution server 6 secures a bandwidth required to distribute video for SIP session controller 4.

A specific sequence will be described below:

Video distribution server 6 sends SIP UPDATE sends SIP UPDATE as a bandwidth securing request for securing a fraction of the bandwidth that is needed for distributing video content, to SIP session controller 4 (S920). SIP session controller 4 requests bandwidth controller 3 to make a bandwidth reservation for video distribution (S921).

Bandwidth controller 3 operates routers or the like in IP network 1 to perform a bandwidth reserving process (S922). When a bandwidth is successfully reserved, bandwidth controller 3 sends a confirmation response to SIP session controller 4 (S923). When the bandwidth reservation is successful and it is found that the bandwidth can be secured, SIP session controller 4 sends SIP UPDATE to user terminal 2 (S924), indicating a change in the bandwidth that can be used.

In response to SIP UPDATE in S920, user terminal 2 sends SIP 200 OK to SIP session controller 4 (S925). SIP session controller 4 sends a request to secure the bandwidth reserved in S921, S922, S923 to bandwidth controller 3 (S926).

Bandwidth controller 3 operates routers or the like in IP network 1 to perform a bandwidth securing process (S927). When the bandwidth is successfully secured, bandwidth controller 3 sends a confirmation response to SIP session controller 4 (S928). When the bandwidth for the distribution of video content is successfully secured, SIP session controller 4 sends SIP 200 OK as a success response to SIP UPDATE in S23 to video distribution server 6 (S929).

Video distribution server 6 sends RTSP 200 OK as a success response to RTSP SETUP in S22 to user terminal 2 (S930).

According to the present invention, as with the first exemplary embodiment, when an SIP session is established, the SIP session controller performs only a priority control process for enabling a control signal for video distribution, according to the RTSP or the like, to preferentially flow in the communication path. When video distribution server 6 receives a distribution start request and finds a bandwidth that is required for distributing video content, video distribution server 6 secures the required bandwidth. Therefore, portal server 5, etc. does not need to have information about the bandwidth that is needed for distributing video content. Furthermore, since an actual bandwidth is secured after a required bandwidth is determined by a negotiation between user terminal 2 and video distribution server 6, a bandwidth that is used can be flexibly set by taking into consideration the bandwidth that is available for use and the capability of the user terminal 2. The bandwidth can efficiently be utilized since only the required bandwidth is secured.

The present invention has been described above with respect to the exemplary embodiment. However, the present invention is not limited to the above exemplary embodiment. As illustrated in the first exemplary embodiment, various changes that can be understood by those skilled in the art may be made to the arrangement and details of the present invention within the scope of the present invention.

The present application claims priority based on Japanese patent application No. 2007-016380 filed on Jan. 26, 2007, and incorporates herein the entire disclosure thereof by reference.

The invention claimed is:

1. A video distribution system comprising a user terminal, a bandwidth controller, an SIP session controller, and a video distribution server which are interconnected through an IP network, wherein:

said user terminal sends a session establishing request for securing a session, according to an SIP with the video distribution server, to said SIP session controller, based on content information including information for the user terminal to establish a session with the video distribution server;

when said SIP session controller receives said session establishing request, said SIP session controller establishes a session between said user terminal and said video distribution server, and makes a first bandwidth securing request for requesting said bandwidth controller to reserve a first bandwidth for the distribution of video content in a communication path between said user terminal and said video distribution server;

when said bandwidth controller receives said first bandwidth securing request, said bandwidth controller secures the first bandwidth for the distribution of video content in the communication path between said user terminal and said video distribution server;

said user terminal or said video distribution server makes a second bandwidth changing request for requesting said SIP session controller to change the first bandwidth for the distribution of video content to match a second bandwidth that is required for distributing video content;

when said SIP session controller receives said second bandwidth changing request, said SIP session controller makes a third bandwidth changing request for requesting said bandwidth controller to change the first bandwidth for distribution of video content which is secured in the communication path between said user terminal and said video distribution server to the second bandwidth that is required for distributing video content; and when said bandwidth controller receives said third bandwidth changing request, said bandwidth controller changes the first bandwidth which is secured in the communication path between said user terminal and said video distribution server to the second bandwidth that is required for distributing video content.

2. A video distribution system comprising a user terminal, a bandwidth controller, an SIP session controller, and a video distribution server which are interconnected through an IP network, wherein:

said user terminal makes a session establishing request for requesting said SIP session controller to establish a session, according to an SIP with the video distribution server, based on content information including information for the user terminal to establish a session with the video distribution server;

when said SIP session controller receives said session establishing request, said SIP session controller establishes a session between said user terminal and said video distribution server, and makes a priority control process request for requesting said bandwidth controller to enable a packet for video distribution control to preferentially flow in a communication path between said user terminal and said video distribution server;

when said bandwidth controller receives said priority control process request, said bandwidth controller performs the priority control process for enabling the packet for video distribution control to preferentially flow in the communication path between said user terminal and said video distribution server;

said user terminal or said video distribution server makes a first bandwidth securing request for requesting said SIP session controller to reserve a first bandwidth that matches a bandwidth that is required for distributing video content;

when said SIP session controller receives said first bandwidth securing request, said SIP session controller makes a second bandwidth securing request for requesting said bandwidth controller to reserve a second bandwidth for the distribution of video content in the communication path between said user terminal and said video distribution server; and when said bandwidth controller receives said second bandwidth securing request, said bandwidth controller secures the second bandwidth that is required for distributing video content in the communication path between said user terminal and said video distribution server.

3. A video distribution system according to claim 2, wherein:

upon reception of a session establishing request, said SIP session controller establishes a session between said user terminal and said video distribution server, and makes a priority control request for requesting said bandwidth controller to enable a packet for video distribution control to preferentially flow in a communication path between said user terminal and said video distribution server; and upon reception of the first bandwidth securing request for securing the first bandwidth from said user terminal or said video distribution server, said SIP session controller makes the second bandwidth securing request for requesting said bandwidth controller to reserve the second bandwidth for the distribution of video content in the communication path between said user terminal and said video distribution server.

4. A video distribution system according to claim 2, wherein:

when said bandwidth controller receives a priority control request for enabling a packet for video distribution control to preferentially flow in a communication path between said user terminal and said video distribution server from said SIP session controller, said bandwidth controller performs a priority control process for enabling a packet for video distribution control to preferentially flow in the communication path between said user terminal and said video distribution server, and when said bandwidth controller receives the second bandwidth securing request for securing the second bandwidth for the distribution of video content in the communication path between said user terminal and said video distribution server from said SIP session controller, said bandwidth controller secures the requested second bandwidth in the communication path between said user terminal and said video distribution server.

5. A video distribution system according to claim 2, wherein:

after said bandwidth controller performs a priority control process for enabling a packet for video distribution control to preferentially flow in a communication path between said user terminal and said video distribution server, said video distribution server makes the first bandwidth securing request for requesting said SIP session controller to reserve the first bandwidth.

6. A video distribution system according to claim 2, wherein:
after said bandwidth controller performs a priority control process for enabling a packet for video distribution control to preferentially flow in a communication path between said user terminal and said video distribution server, said user terminal makes the first bandwidth securing request for requesting said SIP session controller to reserve the first bandwidth.

7. A video distribution method to be carried out in a video distribution system including a user terminal, a bandwidth controller, an SIP session controller, and a video distribution server which are interconnected through an IP network, wherein:
said user terminal makes a session establishing request for requesting said SIP session controller to establish a session according to an SIP with the video distribution server, based on content information including information for the user terminal to establish a session with the video distribution server;
when said SIP session controller receives said session establishing request, said SIP session controller establishes a session between said user terminal and said video distribution server, and makes a first bandwidth securing request for requesting said bandwidth controller to reserve a first bandwidth for the distribution of video content in a communication path between said user terminal and said video distribution server;
when said bandwidth controller receives said first bandwidth securing request, said bandwidth controller secures the first bandwidth for the distribution of video content in the communication path between said user terminal and said video distribution server;
said user terminal or said video distribution server makes a second bandwidth changing request for requesting said SIP session controller to change the first bandwidth for the distribution of video content to match a second bandwidth that is required for distributing video content;
when said SIP session controller receives said second bandwidth changing request, said SIP session controller sends a third bandwidth changing request for requesting said bandwidth controller to change the first bandwidth for the distribution of video content which is secured in the communication path between said user terminal and said video distribution server to the second bandwidth that is required for distributing video content; and
when said bandwidth controller receives said third bandwidth changing request, said bandwidth controller changes the first bandwidth which is secured in the communication path between said user terminal and said video distribution server to the second bandwidth that is required for distributing video content.

8. A video distribution method to be carried out in a video distribution system including a user terminal, a bandwidth controller, an SIP session controller, and a video distribution server which are interconnected through an IP network, wherein:
said user terminal makes a session establishing request for requesting said SIP session controller to establish a session, according to an SIP with the video distribution server, based on content information including information for the user terminal to establish a session with the video distribution server;
when said SIP session controller receives said session establishing request, said SIP session controller establishes a session between said user terminal and said video distribution server, and makes a priority control process request for requesting said bandwidth controller to enable a packet for video distribution control to preferentially flow in a communication path between said user terminal and said video distribution server;
when said bandwidth controller receives said priority control process request, said bandwidth controller performs the priority control process for enabling the packet for video distribution control to preferentially flow in the communication path between said user terminal and said video distribution server;
said user terminal or said video distribution server makes a first bandwidth securing request for requesting said SIP session controller to reserve a first bandwidth that matches a bandwidth that is required for distributing video content;
when said SIP session controller receives said first bandwidth securing request, said SIP session controller makes a second bandwidth securing request for requesting said bandwidth controller to reserve a second bandwidth for the distribution of video content in the communication path between said user terminal and said video distribution server; and
when said bandwidth controller receives said second bandwidth securing request, said bandwidth controller secures the second bandwidth that is required for distributing video content in the communication path between said user terminal and said video distribution server.

9. A video distribution system comprising a user terminal, a bandwidth controller, an SIP session controller, and a video distribution server which are interconnected through an IP network, wherein:
said user terminal makes a session establishing request for requesting said SIP session controller to establish a session, according to an SIP with the video distribution server, based on content information including information for the user terminal to establish a session with the video distribution server;
when said SIP session controller receives said session establishing request, said SIP session controller establishes a session between said user terminal and said video distribution server, and makes a first bandwidth securing request for requesting said bandwidth controller to reserve a first bandwidth for the distribution of video content in a communication path between said user terminal and said video distribution server;
when a session is established between said user terminal and said video distribution server;
said bandwidth controller, upon reception of said first bandwidth securing request, secures the first bandwidth for the distribution of video content in the communication path between said user terminal and said video distribution server;
said user terminal or said video distribution server makes a second bandwidth changing request for requesting said SIP session controller to change the first bandwidth for the distribution of video content;
when said SIP session controller receives said second bandwidth changing request, said SIP session controller makes a third bandwidth changing request for requesting said bandwidth controller to change the first bandwidth for the distribution of video content which is secured in the communication path between said user terminal and said video distribution server to the requested second bandwidth; and when said bandwidth controller receives said third bandwidth changing request, said bandwidth controller changes the first bandwidth which is secured in the communication path between said user terminal and said video distribution server to the requested second bandwidth.

10. A video distribution system according to claim 9, wherein:

said user terminal makes a session establishing request for requesting said SIP session controller to establish a session, according to an SIP with the video distribution server, based on content information including information for the user terminal to establish a session with the video distribution server;

when said SIP session controller receives said session establishing request, said SIP session controller establishes a session between said user terminal and said video distribution server, and makes the first bandwidth securing request for requesting said bandwidth controller to reserve the first bandwidth for the distribution of video content in a communication path between said user terminal and said video distribution server;

when a session is established between said user terminal and said video distribution server;

said bandwidth controller, upon reception of said first bandwidth securing request, secures the first bandwidth for the distribution of video content in the communication path between said user terminal and said video distribution server;

said user terminal or said video distribution server makes the second bandwidth changing request for requesting said SIP session controller to change the first bandwidth for the distribution of video content;

when said SIP session controller receives said second bandwidth changing request, said SIP session controller makes the third bandwidth changing request for requesting said bandwidth controller to change the first bandwidth for the distribution of video content which is secured in the communication path between said user terminal and said video distribution server to the requested second bandwidth; and when said bandwidth controller receives said third bandwidth changing request, said bandwidth controller changes the first bandwidth which is secured in the communication path between said user terminal and said video distribution server to the requested second bandwidth.

11. A video distribution system according to claim 9, wherein:

said user terminal makes a session establishing request for requesting said SIP session controller to establish a session, according to an SIP with the video distribution server, based on content information including information for the user terminal to establish a session with the video distribution server;

when said SIP session controller receives said session establishing request, said SIP session controller establishes a session between said user terminal and said video distribution server, and makes the first bandwidth securing request for requesting said bandwidth controller to reserve the first bandwidth for the distribution of video content in a communication path between said user terminal and said video distribution server;

when a session is established between said user terminal and said video distribution server;

said bandwidth controller, upon reception of said first bandwidth securing request, secures the first bandwidth for the distribution of video content in the communication path between said user terminal and said video distribution server;

said user terminal or said video distribution server makes the second bandwidth changing request for requesting said SIP session controller to change the first bandwidth for the distribution of video content;

when said SIP session controller receives said second bandwidth changing request, said SIP session controller makes a third bandwidth changing request for requesting said bandwidth controller to change the first bandwidth for the distribution of video content which is secured in the communication path between said user terminal and said video distribution server to the second requested bandwidth; and when said bandwidth controller receives said third bandwidth changing request, said bandwidth controller changes the first bandwidth which is secured in the communication path between said user terminal and said video distribution server to the requested second bandwidth.

12. A video distribution system according to claim 9, wherein:

said user terminal makes a session establishing request for requesting said SIP session controller to establish a session, according to an SIP with the video distribution server, based on content information including information for the user terminal to establish a session with the video distribution server;

when said SIP session controller receives said session establishing request, said SIP session controller establishes a session between said user terminal and said video distribution server, and makes the first bandwidth securing request for requesting said bandwidth controller to reserve the first bandwidth for the distribution of video content in a communication path between said user terminal and said video distribution server;

when a session is established between said user terminal and said video distribution server;

said bandwidth controller, upon reception of said first bandwidth securing request, secures the first bandwidth for the distribution of video content in the communication path between said user terminal and said video distribution server;

said user terminal or said video distribution server makes the second bandwidth changing request for requesting said SIP session controller to change the first bandwidth for the distribution of video content;

when said SIP session controller receives said second bandwidth changing request, said SIP session controller makes the third bandwidth changing request for requesting said bandwidth controller to change the first bandwidth for the distribution of video content which is secured in the communication path between said user terminal and said video distribution server to the requested second bandwidth; and when said bandwidth controller receives said third bandwidth changing request, said bandwidth controller changes the first bandwidth which is secured in the communication path between said user terminal and said video distribution server to the requested second bandwidth.

13. A video distribution system according to claim 9, wherein:

said user terminal makes a session establishing request for requesting said SIP session controller to establish a session, according to an SIP with the video distribution server, based on content information including information for the user terminal to establish a session with the video distribution server;

when said SIP session controller receives said session establishing request, said SIP session controller establishes a session between said user terminal and said video distribution server, and makes the first bandwidth securing request for requesting said bandwidth controller to reserve the first bandwidth for the distribution of video content in a communication path between said user terminal and said video distribution server;

when a session is established between said user terminal and said video distribution server;

said bandwidth controller, upon reception of said first bandwidth securing request, secures the first bandwidth for the distribution of video content in the communication path between said user terminal and said video distribution server;

said user terminal or said video distribution server makes the second bandwidth changing request for requesting said SIP session controller to change the first bandwidth for the distribution of video content;

when said SIP session controller receives said second bandwidth changing request, said SIP session controller makes the third bandwidth changing request for requesting said bandwidth controller to change the first bandwidth for the distribution of video content which is secured in the communication path between said user terminal and said video distribution server to the second requested bandwidth; and when said bandwidth controller receives said third bandwidth changing request, said bandwidth controller changes the first bandwidth which is secured in the communication path between said user terminal and said video distribution server to the requested second bandwidth.

14. A video distribution method to be carried out in a video distribution system including a user terminal, a bandwidth controller, an SIP session controller, and a video distribution server which are interconnected through an IP network, wherein:

said user terminal makes a session establishing request for requesting said SIP session controller to establish a session according to an SIP with the video distribution server, based on content information including information for the user terminal to establish a session with the video distribution server;

when said SIP session controller receives said session establishing request, said SIP session controller establishes a session between said user terminal and said video distribution server, and makes a first bandwidth securing request for requesting said bandwidth controller to reserve a first bandwidth for the distribution of video content in a communication path between said user terminal and said video distribution server;

when a session is established between said user terminal and said video distribution server;

said bandwidth controller, upon reception of said first bandwidth securing request, secures the first bandwidth for the distribution of video content in the communication path between said user terminal and said video distribution server;

said user terminal or said video distribution server makes a second bandwidth changing request for requesting said SIP session controller to change the secured first bandwidth for the distribution of video content;

when said SIP session controller receives said second bandwidth changing request, said SIP session controller makes a third bandwidth changing request for requesting said bandwidth controller to change the first bandwidth for the distribution of video content which is secured in the communication path between said user terminal and said video distribution server to the requested second bandwidth; and when said bandwidth controller receives said third bandwidth changing request, said bandwidth controller changes the first bandwidth which is secured in the communication path between said user terminal and said video distribution server to the requested second bandwidth.

* * * * *